April 7, 1959 — M. FAVRET ET AL — 2,880,570
BALANCE WITH ADJUSTABLE MOMENT OF INERTIA
Filed Nov. 26, 1956 — 5 Sheets-Sheet 1
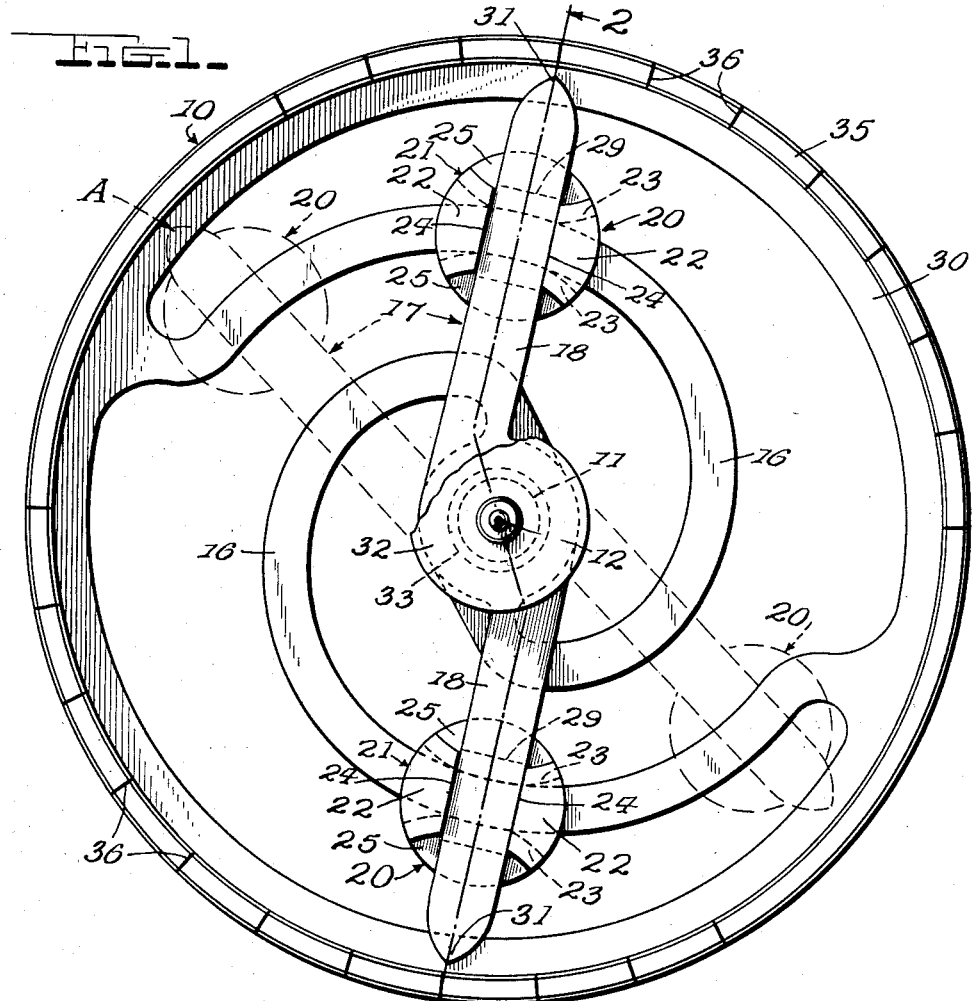
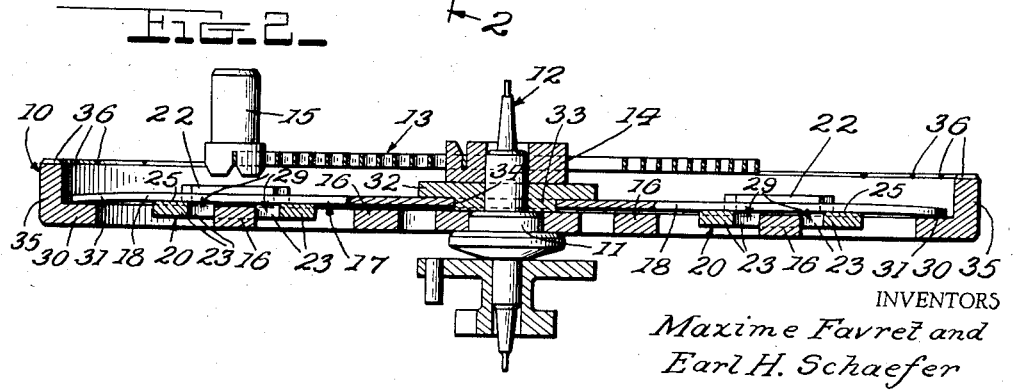
INVENTORS
Maxime Favret and
Earl H. Schaefer
BY Mason, Porter, Diller & Stewart,
ATTORNEYS April 7, 1959   M. FAVRET ET AL   2,880,570
BALANCE WITH ADJUSTABLE MOMENT OF INERTIA
Filed Nov. 26, 1956   5 Sheets-Sheet 2
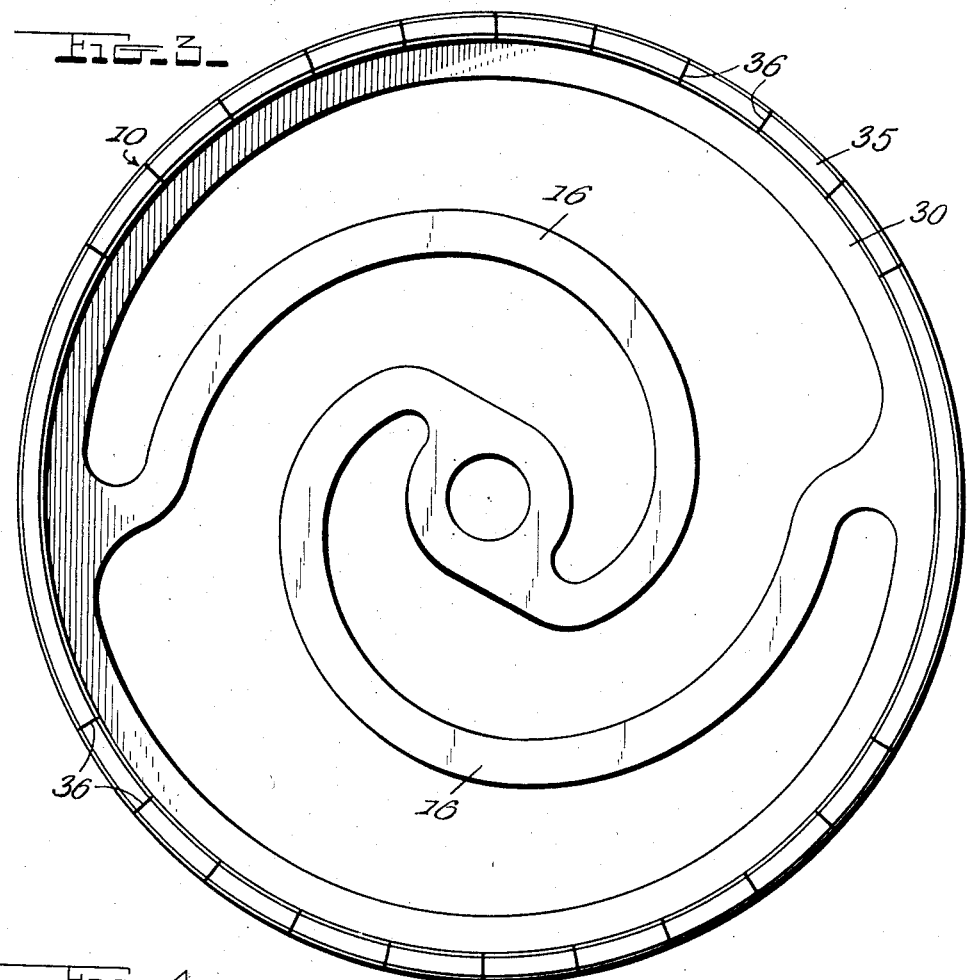
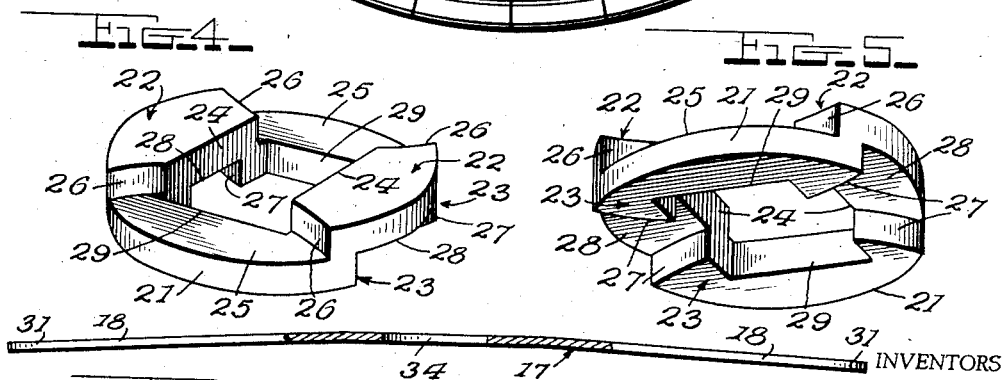
INVENTORS
Maxime Favret and
Earl H. Schaefer
BY Mason, Porter, Diller & Stewart,
ATTORNEYS April 7, 1959 M. FAVRET ET AL 2,880,570
BALANCE WITH ADJUSTABLE MOMENT OF INERTIA
Filed Nov. 26, 1956 5 Sheets-Sheet 3
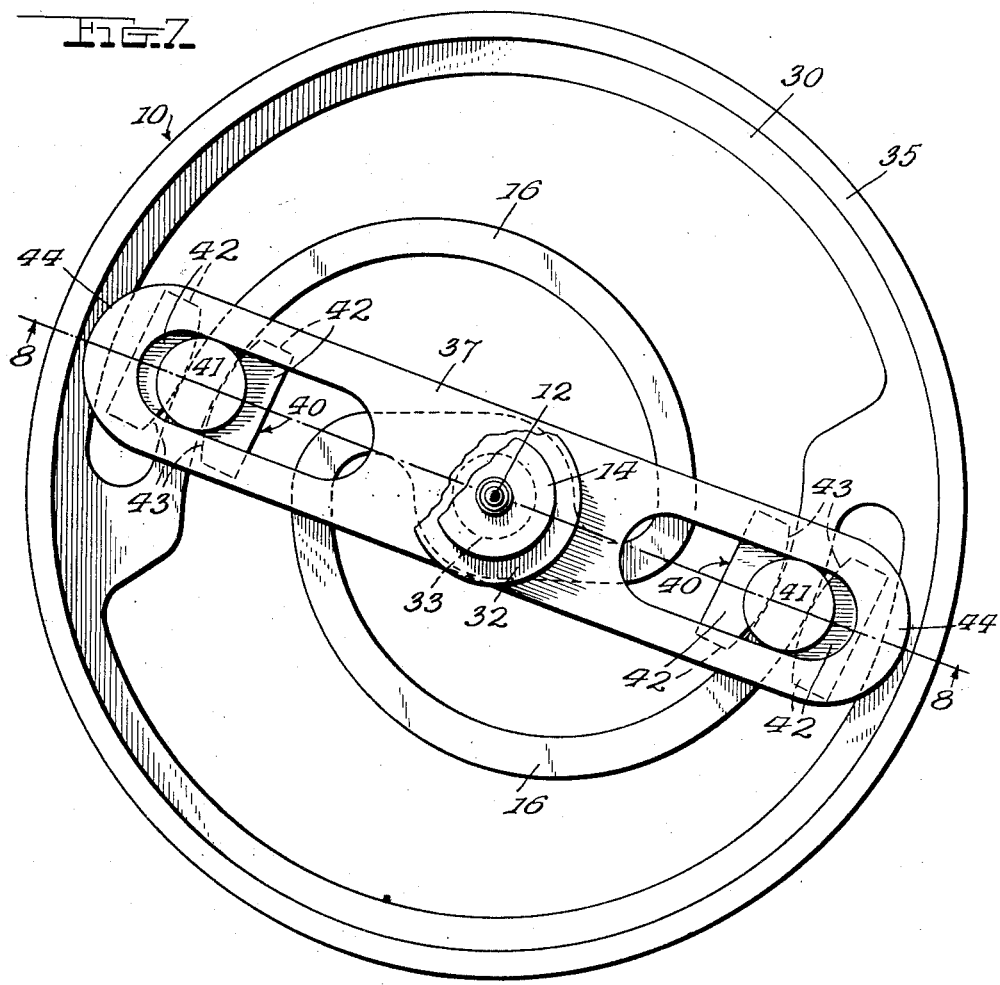
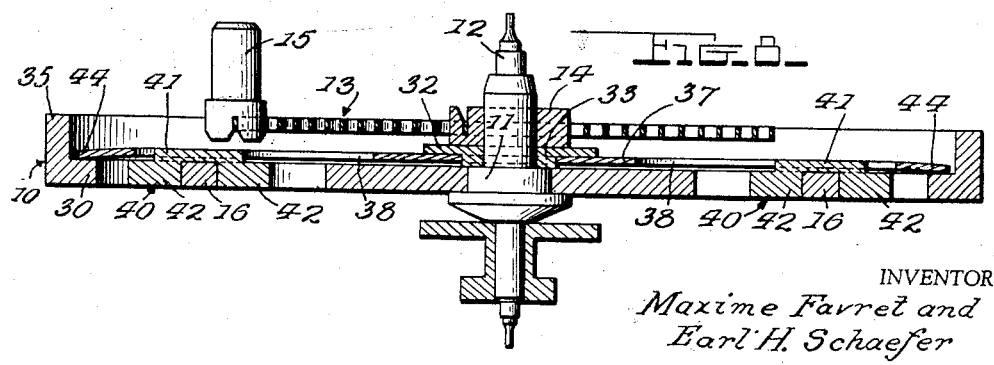
INVENTORS
*Maxime Favret and
Earl H. Schaefer*
BY *Mason, Porter, Diller & Stewart,*
ATTORNEYS April 7, 1959    M. FAVRET ET AL    2,880,570
BALANCE WITH ADJUSTABLE MOMENT OF INERTIA
Filed Nov. 26, 1956    5 Sheets-Sheet 4
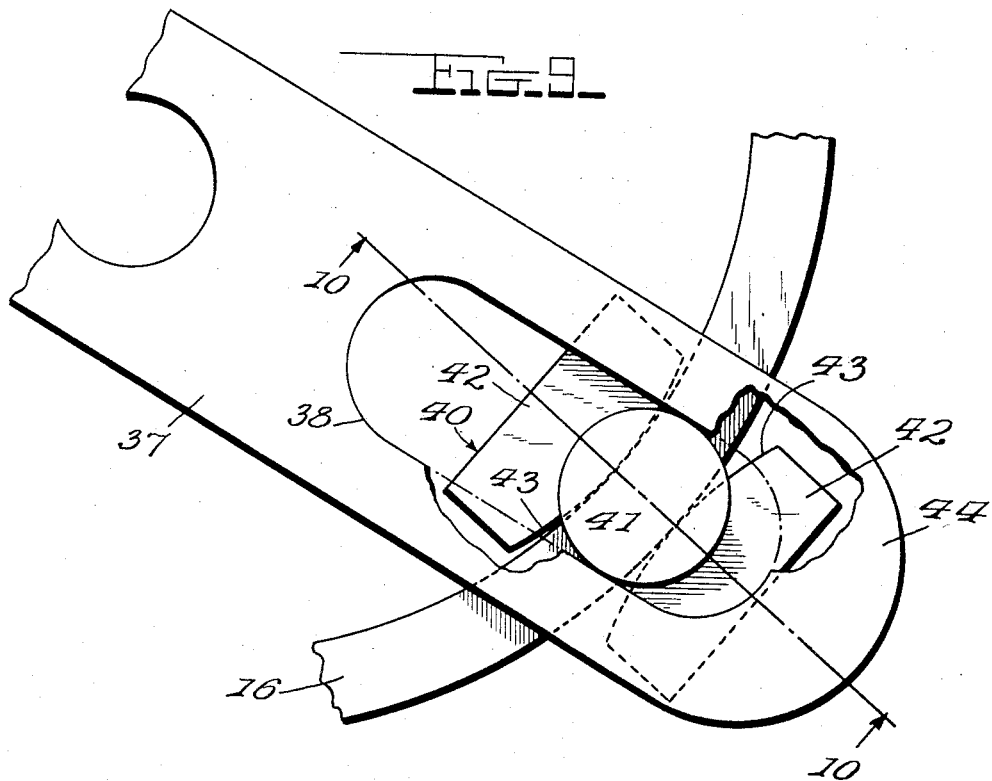
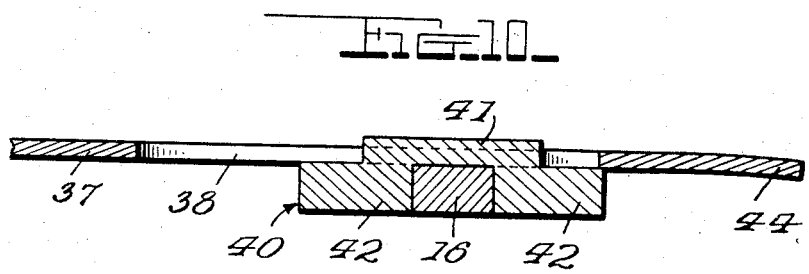
INVENTORS
Maxime Favret and
Earl H. Schaefer
BY Mason, Porter, Diller & Stewart,
ATTORNEYS April 7, 1959  M. FAVRET ET AL  2,880,570
BALANCE WITH ADJUSTABLE MOMENT OF INERTIA
Filed Nov. 26, 1956  5 Sheets-Sheet 5
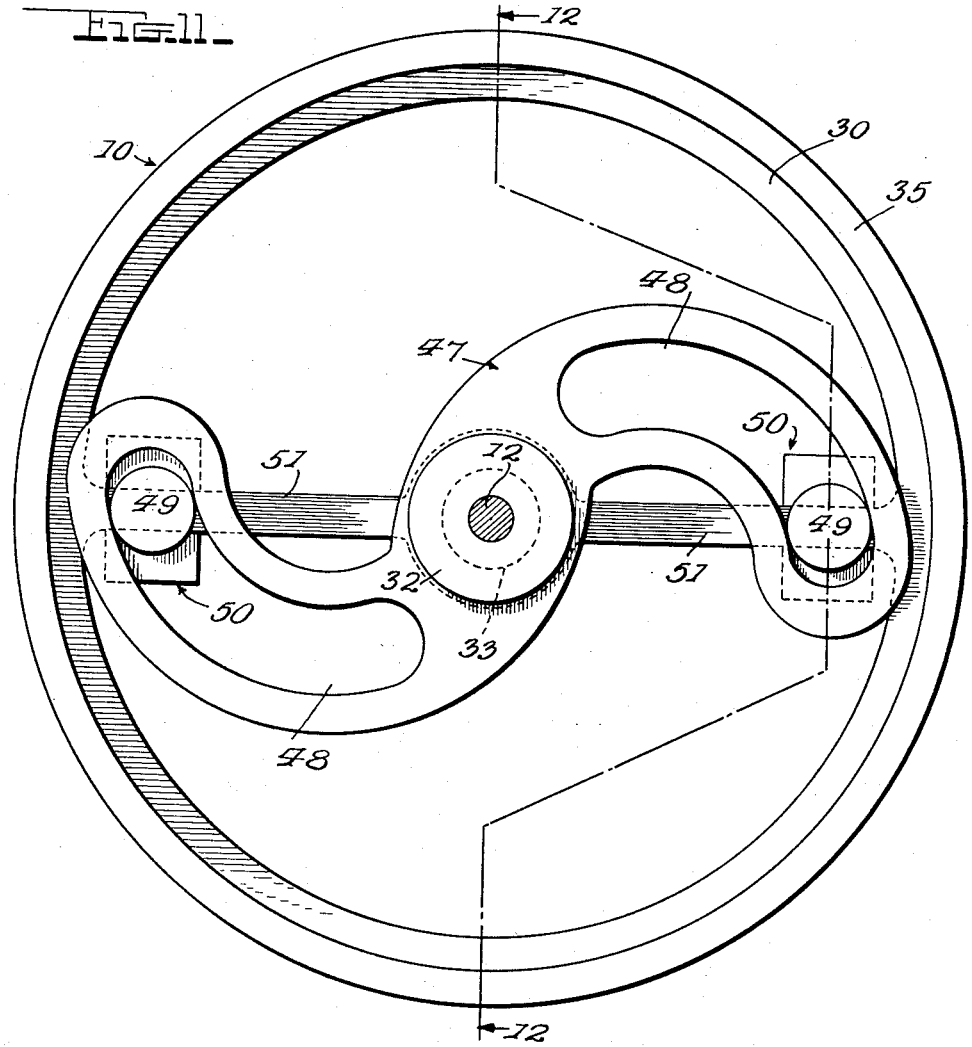
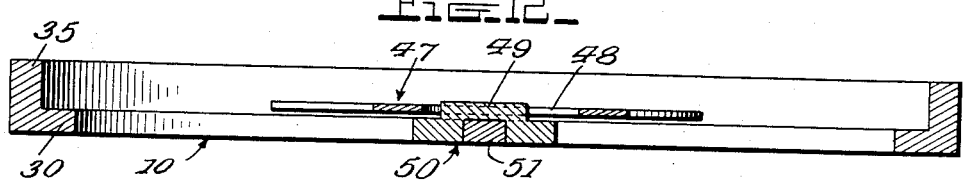
INVENTORS
Maxime Favret and
Earl H. Schaefer
BY Mason, Porter, Diller & Stewart,
ATTORNEYS

United States Patent Office 2,880,570
Patented Apr. 7, 1959

2,880,570

BALANCE WITH ADJUSTABLE MOMENT OF INERTIA

Maxime Favret and Earl H. Schaefer, Elgin, Ill., assignors to Elgin National Watch Company, Elgin, Ill., a corporation of Illinois Application November 26, 1956, Serial No. 624,358

11 Claims. (Cl. 58—107)

This invention relates to a horological balance including adjustable masses whereby the radius of gyration and therewith the moment of inertia may be regulated for determining the rate of balance.

It has been long known to provide regulators which include a regulator lever pivoted on the balance cock and having an element for engaging the hairspring, wherewith a movement of the regulator lever effects variation of the point along the hairspring at which the lever element is engaged, and thus varying the effective length of the hairspring between the regulator element and the point of attachment of the hairspring to the balance, e.g. the hairspring collet on the balance staff. This control by varying the functioning or effective length of the hairspring has serious disadvantages. For example, such a regulating change introduces an isochronal error, particularly if the element is formed by regulator pins which are loose relative to the hairspring. Also, such regulators require exact adjustment and shaping of the hairspring over the entire portion thereof which may be engaged by the element for the intended range of adjustment.

It has long been known to employ horological balances for controlling the rate of movement of an indicator or other device; and to provide for adjustment of the rate of the balance itself by removable or adjustable screws or like parts. Such screws are tightly fitted and extend radially relative to the balance axis, and are rotated for accomplishing fine adjustment of the time rate, by a shift of the moment of inertia. The structures are expensive to manufacture, give a limited adjustment range, and each screw must be independently adjusted, but with the screws, e.g. diametrically opposite ones, so moved that the poise of the balance is maintained.

According to the present invention, the hairspring can be kept essentially invariable mechanically, and the rate is controlled by varying the moment of inertia of the balance. Therewith is attained a structure fulfilling the need for a fine adjustment for time rate, with ease and quickness of adjustment, manufacturing and assembling simplicity at low cost, and capable of effecting adjustment of the time rate without change of poise. No screws, with their cost, are required; and by their absence there is better distribution of the material of the balance, with a maximum at the periphery, and thus the ratio of the moment of inertia to the total mass of the balance system is improved.

A feature of the invention is the provision of a balance having a regulatory device including a first guide means fixed to the balance wheel, a second guide means movable about the balance axis relative to the first guide means, and bodies controlled and guided by the relative movements of said guide means and thereby compelled to occupy correlated radial positions relative to the balance axis.

Another feature is the provision of such a device in which one guide means comprises spirally directed parts and the other guide means comprises radially directed parts, and the movements and positions of the bodies conditioned by relative shifting of said guide means does not change the poise of the system.

Another feature is the provision of a balance structure in which the balance rim is supported relative to the balance staff by resiliently flexible arms, and thereby enabling the balance to resist shock, with bodies movable along said arms and resiliently held thereto by body-adjustment means.

A further feature is the provision of a balance structure including balance arms and a regulating lever, all concentric to the balance axis; with bodies having parts engaging and movable along the arms and in radial planes of the arms, and also parts engaging and movable along the lever and in the radial planes of the lever, whereby a small radial dimension is occupied by the balance and its regulating parts.

A further feature is the provision of a balance structure comprising a balance rim, balance arms, a lever movable about the balance axis, and bodies guided by the arms and levers and occupying variable radial positions relative to the balance axis; the lever being of resilient material and having at least one end frictionally engaged with the balance rim for maintaining the adjusted positions of said bodies.

Illustrative practices are shown in the accompanying drawings, in which:

Fig. 1 is a plan view of a balance with regulator parts according to this invention thereon, the hairspring and its collet being omitted for clearness, and the regulator parts being shown in two positions by full and dash lines.

Fig. 2 is a diametrical sectional view of the device in Fig. 1, with the hairspring shown, on line 2—2 of Fig. 1.

Fig. 3 is an end elevation of the balance wheel of Figs. 1 and 2.

Fig. 4 is a perspective view of a balance weight of Fig. 1, from a position above the end planes thereof.

Fig. 5 is a perspective view of a balance weight of Fig. 1, from a position below the end planes thereof.

Fig. 6 is a side elevation of the regulator lever of Fig. 1, in non-assembled condition.

Fig. 7 is a plan view of another form of construction, corresponding to Fig. 1.

Fig. 8 is a sectional view of the form of Fig. 7, corresponding to the section in Fig. 6.

Fig. 9 is an enlarged view of a part of Fig. 7.

Fig. 10 is a section on line 10—10 of Fig. 9.

Fig. 11 is a view corresponding to Fig. 1, of a further form of construction.

Fig. 12 is a section of the structure in Fig. 11 on line 12—12 thereof.

In Figs. 1–6, the balance wheel 10 is on a portion 11 of a balance staff 12. The hairspring 13 is fixed at its inner end to a collet 14 on the balance staff 12 and at its outer end to a stud 15 which is fixed in known manner in a watch plate, e.g. the balance cock (not shown). In this illustrated structure, the balance wheel has the spiral arms 16 extending from its rim to its center, the arms 16 being of uniform width over the arc for adjustment, this arc being greater than 180 degrees in the illustrated form. These arms 16 provide a first member of the regulator assembly. A second member is formed of a regulating lever 17 which can be moved about the balance axis, and which has diametrically opposed arms 18 in the illustrated form, these arms illustratively being chordal relative to the balance axis and overlying the arms 16 throughout the arc of relative movement. These first and second members are concentric and symmetrical to the balance axis. Third members of the regulatory assembly are provided by the bodies 20 which can be mechanically fashioned in quantity and identical in mass. As shown in Figs. 4 and 5, each body 20 has a circular periphery provided by a surface 21 which is cut away at the top and bottom ends of the body to provide a pair of top lugs 22 and a pair of bottom lugs 23, with each pair diametrically opposed, and with the two pairs arranged at 90 degrees about the general axis of the surface 21 relative to one another. The inner surfaces 24 of the top lugs 22 are parallel to one another and to the common axis and provide between them a groove for closely receiving an arm 18 which can bear against the floor surfaces 25 between the lugs: the chordal surfaces 26 of the top lugs 22 are illustratively arcuate and are so cut as to determine the mass of the body 20. The inner surfaces 27 of the bottom lugs are arcuate at a radius slightly less than the curvature of the arms 16, illustratively being symmetrical so that the body may be mounted in either position with its lugs 23 providing a groove in which is closely fitted an arm 16 which also rests against the surfaces 28 in a radial plane between the lugs 23. In the illustrated form, center parts of the surfaces 27 are cut away or recessed at 29 as by a hole extending axially through the body 20 and separating the pairs of surfaces 25, 25 and 28, 28.

It is preferred to have the cross-section of the balance wheel rim include an inwardly directed flange 30 in the planes of the arms 16; and to have the lever 17 of spring material with its ends 31, Fig. 6, bent toward this flange 30 for frictional engagement therewith under the resilient action of the lever 17 in axial planes. An assembly washer has an enlarged head 32 and a smaller spacer portion 33 and is fitted tightly around the balance staff 12; the portion 33 fits a central circular aperture 34 of the lever 17 and provides pivot support therefor in its movements about the balance axis, with the axial length of the portion 33 being greater than the thickness of the lever 17. The head 32 thus acts as a stop for applying force to the lever 17 during assembly and assuring the frictional engagement of the lever ends 31 with the surface of flange 30.

The assembly of the parts is simple. A balance wheel 10 with its arms 16 is pressed upon the part 11 of a staff 12, and the parts loosely supported in a fixture, which can be a plane surface with a staff-receiving hole. A body 20 is placed upon each arm 16. A lever 17 is slipped over the upper end of the staff 12, and the bodies 20 alined with the lever arms 18. An assembly washer 32, 33 is applied, with the part 33 engaging in the central aperture of the lever 17. This washer may itself be made a press-fit upon the staff 12, or it may be a sliding fit with the hairspring collet 14 effective to hold it in position. In either case, the washer 32, 33 is pressed down until its portion 33 is seated against the balance wheel, thereby establishing the friction-maintaining resilient engagement of the lever ends 31 with the flange 30. Pressed positioning of the collet 14 with its hairspring 13 and attached stud 15 completes the top assembly; noting that the hairspring, collet and stud can be previously assembled under close control of their relative positions and effective hairspring length.

Such assembly can be effected in any relative positions of the bodies 20 on the arms 16. When a group of like watches or other horological devices is being assembled, with the usual tolerances, the balance assemblers can move the lever 17 to a designated position along the arcs of arms 16; and the balance structure is thus introduced into the total movement structure. If the assembler has designated the dash line position A of Fig. 1, the bodies 20 are near the maximum outward positions, the radii of gyration are near maximum, and thus essentially all of the devices will show a lower than standard rate. The adjuster, by noting the rate error of 2 minutes per day slow as reported by a testing machine for example, and knowing that a movement of the lever 17 for the full 180 degrees of arc in the illustrative form will represent a gain or loss of about 8 minutes per day with given masses of bodies 20, makes a trial adjustment by moving the lever 17 clockwise about 45 degrees relative to the arms 16 while holding the balance rim at a standstill. This causes a sliding of the bodies 20 along the arms 16, and a radially inward movement of the bodies 20 along the arms 16, and a radially inward movement of the bodies 20 relative to the balance axis, to the position shown in full lines in Fig. 1; so that the effective radius of gyration of the total mass is reduced. A further test is made, and a minor clockwise or counterclockwise relative movement of the lever 17 procures a high accuracy of rating.

The balance wheel rim, in Figs. 1 and 2, is shown as having the cylindrical flange portion 35, which has the kerfs 36 spaced along its end surface for cooperation with the ends of the lever 17, which are illustratively pointed, for assistance to the adjuster in determining angular movements of adjustment.

In the form shown in Figs. 7–10, the balance wheel and arms, and the staff parts are as in Figs. 1–6. The regulating lever 37 has the slots 38 in its diametrically opposed arms. Each body 40, Figs. 9 and 10, has a circular lug 41 at its top, for close fitting in a slot 38; and its bottom has diametrically opposed lugs 42 with a groove between them for receiving an arm 16 as before. The inward surfaces 43 of the lugs are arcuate, on a slightly less radius than the minimum curvature of an arm 16, being symmetrical and convex as before, to permit assembly and re-assembly without selection of the positioning. The regulating lever 37 is preferably of spring material and bowed as before so that, upon assembly, its ends 44 resiliently and frictionally engage the rim flange 30. The parts can be assembled and adjusted as before.

In the form of construction of Figs. 11 and 12, the lever 47 is pivotally mounted as before for movement about the balance axis, e.g. on an assembly washer 32, 33 as before. Its arms have spiral slots 48 for engaging the upper cylindrical portions 49 of the bodies 50 which have slots in their lower portions for fitting the radial arms 51 of the balance wheel assembly. The outer ends of the lever 47 can be bent downwardly as before, for resilient friction upon the flange 30. The assembly and adjustment operations are as before.

In the several forms, the radial arms of the balance wheel may be resilient so that they can yield, upon shock to the movement, without the inertia or momentum stresses being received or transmitted as sudden impacts upon the staffs and bearings. The regulating levers are then likewise resiliently yielding, so that the bodies are retained in their adjusted positions.

In the above-described poising and rating of balances by screws, it has been a practice to provide the adjuster with groups of screws which are of like shape and mass within a group but with the groups differing in mass from one another. Therewith if a gross error of high or low rate, beyond the ability of the regulating lever on the balance cock to resolve, the adjuster can remove an existing pair of diametrically opposite screws and replace them by a pair from a group of greater or lesser mass. It is within the purview of the present invention to provide bodies of identical size and shape, but in groups made of different metals, e.g. alloys, of different specific gravities, so that like substitutions can be made, noting, however, that with the present structure the replacement bodies are always exactly positioned relative to one another, as distinguished from the rater's need of re-establishing poise in the system, e.g. by careful notation of the number of turns given each screw.

It is obvious that the illustrated practices are not restrictive, and that the invention can be practiced in many ways within the scope of the appended claims.

What is claimed is:

1. A balance with an adjustable moment of inertia, comprising first and second members movable relative to one another about the balance axis, the first member including a balance rim and an axial portion and having a portion constituting an arm extending spirally relative to the axis and connecting the rim and the axial portion, the second member having a portion extending transversely to the spiral portion, and a third member having a surface engaged with the spiral portion and a surface engaged with the transverse portion, whereby upon said relative movement of the first and second members the third member is caused to move in a relative radial direction toward or from the axis.

2. A balance with an adjustable moment of inertia, comprising first and second members movable relative to one another about the balance axis and each being symmetrical with respect thereto, the first member including a balance rim and an axial portion and having portions constituting arms extending spirally relative to the axis and connecting the rim and the axial portion, the second member having portions extending transversely to the spiral portions, and third members each having a surface engaged with one of the spiral portions and a surface engaged with one of the transverse portions, whereby upon said relative movement of the first and second members the third members are each caused to move in relatively radial direction toward or from the axis by substantially equal distances.

3. A balance as in claim 2, in which the second member is a regulating lever having arms extending from the axis and providing said transverse portions thereof, and the third members are bodies having grooves in their tops and bottoms respectively engaged with the lever arms and the spiral portions.

4. A balance as in claim 2, in which the balance rim has a flange in a substantially radial plane, and the second member is of spring material with its ends engaged with the flange, and means are present on the balance for maintaining resilient pressure between said ends and the flange.

5. A balance as in claim 2, in which the second member is a regulating lever extending across the balance for providing said transverse portions, said lever having slots therein opposite the spiral portions, and the third members are bodies having portions engaged in the slots and having grooves engaged with the spiral portions.

6. A balance as in claim 2, in which the third members have grooves engaged with the spiral portions, the surfaces of said grooves engaging the inner part of the spiral portions having a curvature less in radius than the curvature of the spiral portions.

7. A balance as in claim 6, in which the ends of the said engaging surfaces of the grooves are spaced apart by a central gap.

8. A balance as in claim 6, in which the groove walls are symmetrical.

9. A balance as in claim 2, in which the second member is a regulating lever with oppositely extending spiral portions, and the first member comprises a balance rim and an axial portion, said transverse portions connecting the rim and the axial portion.

10. A balance as in claim 9, in which the regulating lever has spiral slots therein, and the third members have portions guidedly engaged in the slots and grooves slidably engaged with the transverse portions.

11. A balance as in claim 2, in which the spiral and transverse portions are of springy material, and the axial portion of the balance includes means to hold said portions under spring tension with the third members therebetween.

References Cited in the file of this patent

UNITED STATES PATENTS 2,770,942    Favret _____ Nov. 20, 1956

FOREIGN PATENTS 7,059    Great Britain _____ of 1904